March 4, 1941.  A. F. DE VIGAN  2,233,520
DUST SEPARATOR
Filed May 6, 1938  2 Sheets-Sheet 1
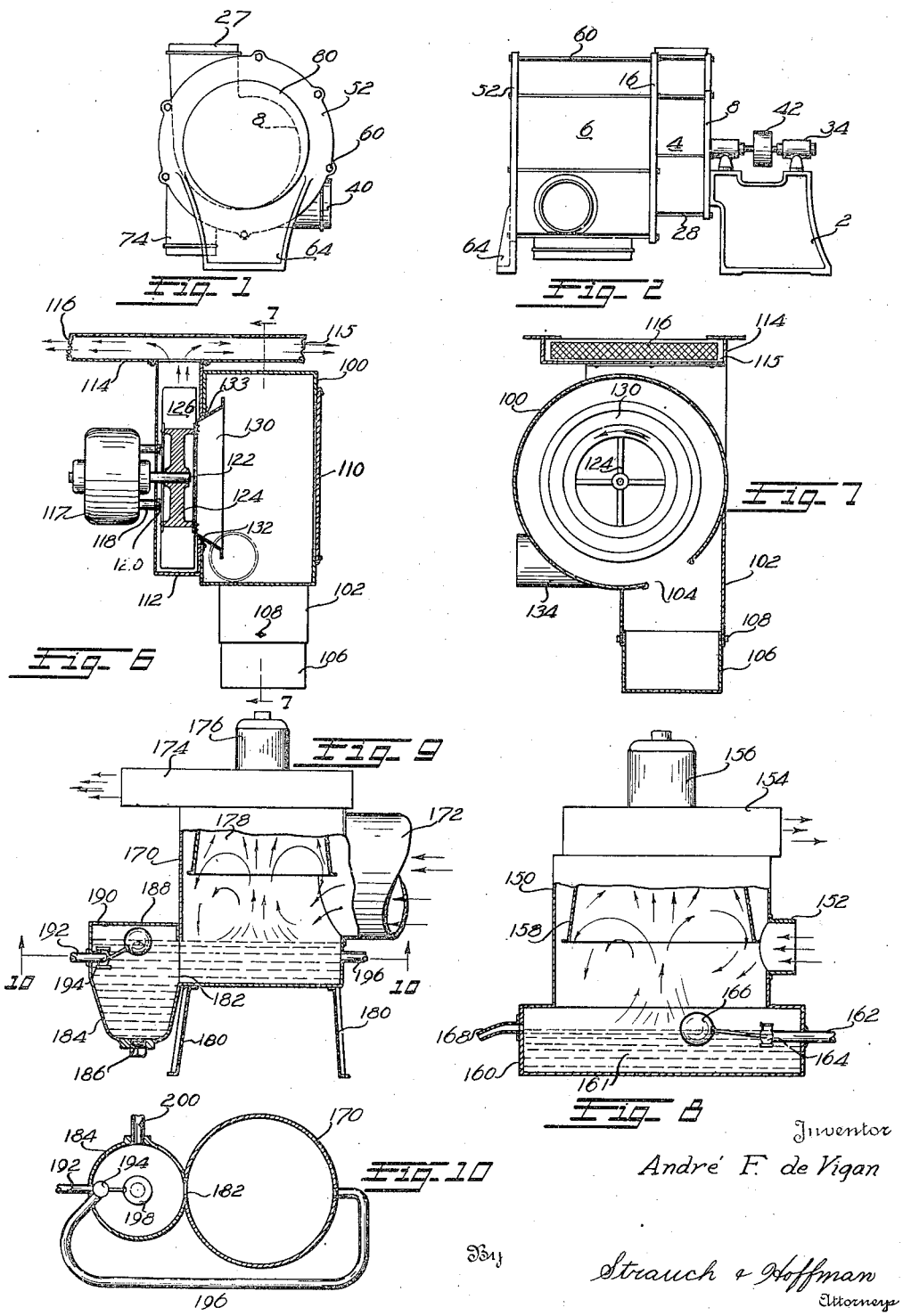
Inventor
André F. de Vigan
By
Strauch & Hoffman
Attorneys

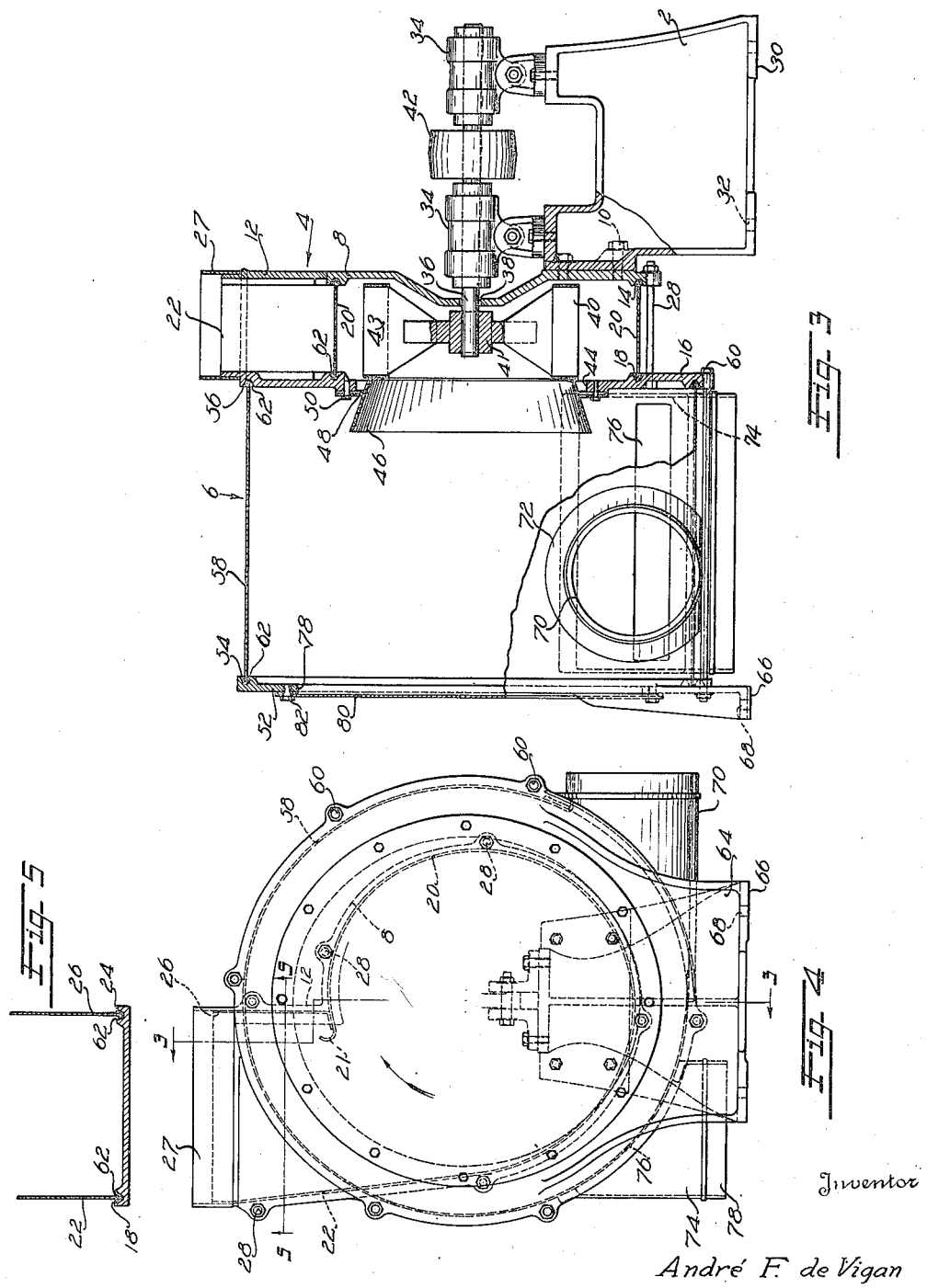

Patented Mar. 4, 1941

2,233,520

UNITED STATES PATENT OFFICE 2,233,520

DUST SEPARATOR

Andre F. de Vigan, Detroit, Mich.

Application May 6, 1938, Serial No. 206,477

3 Claims. (Cl. 183—77)

This invention relates to mechanisms for separating solid particles from a suspending fluid, and more particularly to devices for separating dust or other extraneous solid matter from air. It also contemplates devices for separating particles from fluid which are also operable to pick up particles of a liquid and disperse them through the fluid during removal of said solid particles. In the last connection, this invention is especially concerned with devices for cleaning air and, at the same time, adding a predetermined amount of water vapor thereto in order to increase the humidity of the cleaned air.

The present invention is an improvement on, and a further development of, the invention shown in my copending application Serial No. 134,151, filed March 31, 1937, particularly the mechanism shown in Figure 10 of that application. In the aforementioned figure there is shown a means for separating dust, or other solid particles, from a suspended fluid in which a rotating fan carries a substantially conically shaped dust collector. As is pointed out in said application, by making the angle of the cone sufficiently steep the dust collected in the said cone, due to the action of the fan and cone which rotate together, may be continuously discharged from the cone. The present invention carries this basic idea forward and combines the rotating fan and cone with a surrounding casing which also aids in the separation of the dust or other particles from the suspended fluid as will be more particularly explained as this specification proceeds.

Devices of this general character, which have been hitherto known in the art, generally consist of some sort of a suction or fan means arranged to draw the particle laden fluid, such as dust laden air, into a casing where the dust particles are filtered or screened out by some sort of a screen or filtering medium interposed between the suction means and the discharge for the cleaned fluid from the casing. Mechanisms of this kind are open to several objections, the principal one being that of the extra power necessary to force the air, or other fluid, through the more or less dense filtering or screening medium. Also it is, of course, necessary that such screens be removed frequently, during the use of the mechanism, and either cleaned or be replaced by new screens.

It has also been proposed to separate dust or other suspended particles from a fluid by means of centrifugal force produced by causing the fluid to have a rotary motion within a casing whereby the heavy dust or solid particles are thrown from the rotating mass of fluid and in some manner collected. These devices, as a general rule, involve some sort of tortuous passage or baffle plate arrangement and are, therefore, quite complicated in construction.

While devices of the type just mentioned operate fairly successfully to accomplish their desired purpose, they all involve rather complex mechanisms, which are difficult to manufacture and expensive to produce.

By means of the present invention it is possible to avoid the use of screens or complicated casing constructions, providing tortuous passages, or involved baffle arrangements, thereby providing an extremely simple device which is, however, positive and efficient in its action to accomplish a continuous separation of solid particles from the suspended fluid. By following the teaching of this invention it is possible to provide an improved dust separator which consumes a minimum amount of power, is highly efficient in its action and also one which may be adapted to disperse liquid particles into the cleaned fluid so as to increase its humidity.

Accordingly, it is a principal object of this invention to provide an improved type of separating mechanism wherein the suspended particles are separated by means of a centrifugal action created within a fixed casing by a rotating suction means.

More specifically, it is an object of this invention to provide an improved dust separator wherein a rotating fan, or similar suction means, is arranged to draw dust laden fluid into a casing and to cause it to have a swirling action therein for separating the solid particles suspended in said fluid.

A further object of this invention is to provide an improved dust separator wherein a rotating fan is utilized to cause a swirling action of dust laden fluid within a substantially cylindrical casing and wherein the dust particles are prevented from entering the fan by means of a collecting and aggregating means on said fan which collects dust particles not at first separated by said centrifugal action and returns them to the casing.

It is also an object of this invention to provide an improved dust separator wherein the same may be constructed from a relatively few standardized parts whereby great flexibility in size and economy in manufacture may be obtained.

It is also an object of this invention to provide an improved dust separating means for separating solid particles from fluid within a substantially cylindrical casing wherein a separate dust container or collecting device is associated with said casing for collecting the dust separated from the fluid.

A still further object of this invention is to provide an improved dust separating means of the type discussed above wherein the same is arranged to disperse liquid particles such as water vapor or water drops into the fluid which has been cleaned of its suspended particles.

Another object of this invention is to provide an improved dust separator wherein dust particles are separated from a suspended fluid by means of a swirling action within a cylindrical casing, wherein a body of liquid is provided within the casing subject to the action of the swirling fluid and arranged to receive particles separated from said fluid together with means for maintaining the level of said liquid constant within said casing and having a means for drawing off portions of said liquid with said contained dust particles.

A still further object of this invention is to provide an improved dust separator wherein dust particles are separated from a body of fluid within a cylindrical casing and caused to drop to the lower portion of said casing into a body of liquid contained therein and wherein a container for a second body of liquid is arranged adjacent to the first body of liquid but isolated therefrom to prevent agitation by said fluid stream whereby settling of said collected dust particles is enhanced.

A still further object of this invention is to provide an improved dust separator wherein dust particles are separated from the suspended fluid within a substantially cylindrical casing and caused to be precipitated into a body of liquid contained within the lower part of said casing and wherein an auxiliary reservoir is provided adjacent the lower part of said casing and in communication with the first body of liquid, together with means for maintaining the level of liquid in said reservoir constant, controlled by a float valve, in the auxiliary casing and isolated from any disturbance of the liquid in the main casing by said separating action.

The foregoing and other ancillary objects of this invention will become apparent from a study of the following detailed description of several preferred embodiments thereof when considered with the appended claims and accompanying drawings, wherein:

Figure 1 is an end elevation of a preferred embodiment of my invention;

Figure 2 is a side elevational view of the embodiment shown in Figure 1;

Figure 3 is a partial sectional view of the embodiment shown in Figure 1;

Figure 4 is an end view of the mechanism shown in Figure 3, with certain parts omitted and others shown in dotted lines.

Figure 5 is a partial sectional view taken substantially on the line 5—5 of Figure 4;

Figure 6 is a sectional view of a modified form of my invention;

Figure 7 is a sectional view taken on the line 7—7 of Figure 6;

Figure 8 is a partial sectional view of a further modification of my invention;

Figure 9 is a partial sectional view of a still further modification of my invention; and Figure 10 is a horizontal sectional view of the modification shown in Figure 9 taken substantially on line 10—10 of that figure.

Referring to Figures 1-4, my improved dust separator comprises a bearing pedestal 2, a fan housing 4, and an enlarged casing 6. Plate member 8 is secured to pedestal 2 by bolts 10 and has a tangentially extending portion 12, being otherwise substantially cylindrical, see dotted lines Figure 4. Surrounding the edges of plate 8 is a groove 14.

Spaced from plate 8 is another plate 16 having therein, on the side facing plate 8, a groove 18 which faces and matches groove 14, just mentioned. A curved sheet metal element 20 has its edges received in these grooves, with an extension 22 extending from one end thereof and with a turned up lip 21. A plate 26, received in vertical grooves 24 in these plate members cooperates with extension 22 to form a tangential discharge passage for the fan chamber 4, formed by plates 8 and 16 and element 20. A ferrule or cap member 27 finishes off the outer end of this passage, see Figures 3 and 4. Bolts 28 hold these elements in assembled relation.

Pedestal 2 has a flat base portion 30 provided with holes 32 to accommodate bolts or lag screws for securing the same to a floor or the like. Pillow blocks 34—34 are mounted on pedestal 2 and rotatable therein is a shaft 36, extending into fan housing 4 through an opening 38 in plate 8. Fixed to shaft 36, within housing 4 is a centrifugal fan 40 having a hub portion 41 carrying blades 43. A pulley 42, on shaft 36, receives power from a belt, not shown, to rotate the fan 40 in the direction indicated by the arrow in Figure 4.

Plate 16 is provided with a circular opening 44, concentric with fan 40 and fixed to the blades 43 thereof is a hollow conical member 46 which extends through opening 44 into casing 6. This conical member is slightly smaller than opening 44 and a flexible sealing member 48, secured to plate 16 by bolts 50 substantially closes the annular gap therebetween.

Spaced from plate element 16 is a similar plate element 52, and arranged between these two plate elements is a cylindrical sheet metal wall member 58 with its edges received in oppositely facing and matching grooves 56 and 54 in plate members 16 and 52 respectively.

Bolts 60 extend from the element 16 to plate element 52 as will be seen in Figure 3 and by drawing up these bolts the wall forming element 58 is securely held between these plate elements with their edges in their receiving grooves 54 and 56. A suitable cementing substance indicated at 62 is placed in the grooves 14, 18, 24, 54 and 56 in order to form a substantially air-tight joint.

A duct member 70 having a flange 72 is secured to the outer surface of the wall forming member 58, which is apertured in this point, so that an inlet opening into the separating chamber or casing 6 is provided. A similar duct member 74 is secured to the wall member 58 over an elongated slot 76 formed in said wall member. This slot 76, as can be seen from Figure 3 extends substantially the whole width of the separating chamber 6. The lower end of the duct 74 is provided with a shouldered portion 78 for a purpose to be later described. Plate element 52 is formed with an opening 78 closed by a cover member 80 held in place by bolts 82 and at its lower portion is shaped at 84 to provide supporting leg portions 86, having bolt holes 88 therein.

The operation of this embodiment will now be described. The fan 40 is rotated from a suitable power source through the pulley 42 at a fairly high speed. The rotation of this fan draws air into casing 6 through duct 70 and at the same time tends to create a swirling or rotary motion of the air within the chamber 6. The air drawn into casing 6, through the duct 70, is eventually drawn into the fan 40 through the conical member 46 and discharged from the chamber 4.

Fan 40 rotates in the direction of the arrow in Figure 4 thus the body of air entering through duct 70 is caused to travel around within the casing 6 in this direction. The heaviest dust particles, entering with the body of air, will be immediately thrown radially outwardly under centrifugal action and many of these will pass through the opening 76 immediately. It will be understood that the duct 74 is closed in some suitable manner, for example, by a discharge pipe leading to a closed dust container or by a closed dust container secured directly to the flange portion 78, as, for example, is shown in the modification to be next described. At any rate the duct 74 is closed against the entrance of air or the fluid.

The particles of dust or dirt suspended in the air which pass by slot 76 in the first revolution of the body of air in the casing 6 will be carried up and around in the casing and eventually return to the bottom side and be discharged through to the slot 76 to duct 74. However, lighter particles of dust or dirt suspended in the air will not be as readily thrown to the outside of the casing, formed by wall 58, and some of these will eventually be drawn toward the fan 40 by the suction effect thereof. However, when these lighter dust particles enter within the conical element 46 their circumferential speed is increased to a point such as to cause them to be thrown against the inside of this conical element. As was explained in my copending application, referred to above, if the conical angle of this conical element is very slight the dust and dirt particles will be collected on the inside surface thereon and be held in place on this surface. However, with a sufficiently steep conical angle, as shown, these particles are thrown back into the chamber 6. The particles collected on this conical element are very fine but as they are collected and tend to slide, or roll, outwardly over the conical element they unite with other fine particles and thus aggregate themselves into particles of a heavier character. Accordingly, when they are thrown out of the conical element 46 they are heavy enough to be precipitated against the inside of wall 58 and, by virtue of the swirling air stream therein, eventually are carried around the cylindrical surface of this chamber and finally discharged through the slot 76.

Although the exact theory of the operation of the conical element 46 with respect to these fine particles is not clearly understood, it is believed that the reason for the separation of the dust from the air within this member is due to the fact just mentioned that the circumferential speed of the particles is so greatly increased, when they reach the zone of this element, that they are acted on by a centrifugal force of great enough value to draw them out against the inside of this conical element. At any rate, it is known, by actual experiment with machines of this type, that none of the dust particles enter into the fan and that absolutely clean air is discharged by the fan through the discharge duct for the fan 40, formed by extension 22 of the wall 20 and the wall 26 out through the sleeve member 27.

Accordingly, it is seen that although the chamber 6 is free from any baffle elements or tortuous passages and has no screen or any similar filtering device the operation of this mechanism is such as to entirely separate all particles suspended in the fluid which is drawn into the casing 6 through the duct 70 by the fan 40. As no back pressure is produced, as by filters or other baffles, it will be appreciated that the power necessary to drive the fan is an absolute minimum. Thus, this very simple mechanism, is very efficient for the separation of dust or similar solid particles from fluid such as air.

It will be also noted that the device just described is of such a character as to lend itself very well for quantity production. The few number of parts which comprise this device are of a somewhat standardized shape thus making it possible to build the different sizes of the machines, without complicated machining operations, by simply casting plates corresponding to the plates 8, 16, 52 of different sizes and using sheet metal strips for the wall elements 20, 26 and 58. The assembling of the device is also done with great facility since the whole mechanism is held together by bolts 28 and 60 and the bolts which secure the pedestal to the end plate 8.

In Figures 6 and 7 another modified form of my invention is shown which is very much like that just described. In this construction a sheet metal casing 100, generally cylindrical in shape, has a downwardly extending portion 102 providing a duct leading from an elongated slot 104 in the casing 100. Located within the lower open end of the extension 102 is a cylinder box or container 106 held in place by wing nuts 108. An open end of casing 100 is closed by a cover plate 110 and this casing is secured in any suitable manner to a fan casing 112 likewise constructed out of sheet metal.

Casing 112 is open at its upper end to form a fan outlet duct and is there joined to a base member 114 which is hollow and has openings 115 covered by suitable screens 116 in each end thereof.

A motor 117 is mounted on sleeve elements 118, secured to the wall of casing 112 by bolts 120, and has a shaft 122 extending within the casing 112. Fan 124, having blades 126, is secured on shaft 122 and to the front side of this fan a conical member 130 is fixed so as to extend through an opening 132, connecting the casing 100 with the casing 112. A sealing member 133, similar to member 48, is provided around the outside of the conical member 130.

As in the embodiment just described, this conical element flares or has its larger diameter facing away from the fan 124. Casing 100 is provided with a supply or intake duct 134.

In use the base member 114 which is designed to be secured to a ceiling or other similar supporting wall supports the whole mechanism. When the fan 126 is rotated in the direction shown in Figure 7 the operation is just the same as in the embodiment above described, that is, the air or other fluid is drawn into duct 134 and swirled around within the casing 100 and eventually discharged by the fan 126 through the casing 112 and hollow base member 114. As has already been noted, this swirling action separates the heavier dust particles and discharges them into the opening 104 where they fall into the container 106, while the lighter particles are collected by the conical member 130 and returned to casing 100 for discharge through opening 104. As will be noted, the container 106 closes off the duct 102 so that the fan does not tend to draw air through the slot 104.

In this embodiment the intake duct 134 is located substantially in alignment with the outer end of the conical element 130, whereas in the first described modification the intake duct 70 is located towards the outer end of the casing 6 away from the conical element 46 of that modification.

The operation of the device is substantially the same in each case, however, with the intake duct located adjacent the cone the intake vacuum is slightly reduced. At the same time, the dust separation effect seems to be increased with this location of the intake duct, whereas with the intake duct located outwardly and away from the cone, as in the first described modification, the intake vacuum is increased but the dust separation effect is slightly decreased. Therefore, this opening can be selectively positioned as it is desired to increase or decrease the intake vacuum. It will be noted that in either case the separation of the dust is complete and the clean air is always discharged by the fan.

By extending base 114 and duplicating casings 112 and 100, together with fan 124, conical member 130 etc., a duplex unit, with both separators operated by motor 117, can be conveniently provided.

In Figure 8 I have shown a modification of my dust separating means which is also operable to disperse water vapor within the air which has been cleaned.

This embodiment comprises a substantial cylindrical casing 150 having an intake duct 152, and on which is supported a fan casing 154 enclosing a fan, not shown, but which is driven by motor 156. Carried by the fan, which is similar to those used in the already described modification, is a conical element 158 extending into the chamber formed by the casing 150. The lower part of casing 150 is enlarged to form a second chamber 160 in which a body of liquid 161, such as water supplied through a pipe 162, is maintained at a constant level by a float valve 164 controlled by float 166. Overflow 168 continually carries off water from this chamber 160.

The operation of this device is substantially the same as the other as far as the separation of the dust is concerned. However, with the fan arranged vertically it will be observed that when the dust particles are rotated within the casing 150, due to the swirling action of the fan as already explained, gravity will also act on these dust particles. Therefore, these particles will be eventually precipitated, under the action of gravity, and fall into the body of liquid 161, contained within the chamber 160. It will be also noted that as the fan and conical member 158 rotate they will create a swirling action of the air, drawn in through the duct 152. Thus a cyclonic effect is produced and a certain part of the body of liquid will be drawn up, within the conical member substantially as shown, and in a manner somewhat similar to a waterspout. Particles of this water will be thrown outwardly against the conical member 158. This water will, of course, be thrown out of the conical element by centrifugal force and will carry with it the dust particles which have collected thereon. Also some of the finer water particles, in the form of mist, will be drawn up into the fan and enter into the cleaned air stream thereby increasing its water content.

As the dust particles fall into the water they will float thereon, at least for a short time, to be eventually discharged through overflow 168 which can be connected directly to the sewer or other suitable receptacle.

This device thus serves the double purpose of cleaning the air, or ridding it of suspending solid particles, and at the same time dispersing fine particles of water or, more correctly, water vapor or mist into the cleaned air. This modification is, therefore, especially well suited for conditions where it is desired that a certain degree of humidity be imparted to the air that is cleaned.

In Figures 9 and 10 a still further modification is shown which is substantially like that shown in Figure 8 but in which a particular arrangement of the water chamber is provided.

In this embodiment a cylindrical separating chamber 170 has an inlet duct 172 and a casing 174 enclosing a fan, not shown, driven by motor 176 and carrying a conical element 178. Casing 170 is supported on legs 180, 180 and closed at its lower portion to form a liquid or water containing chamber. At one side this casing is apertured to form a substantially narrow slot 182 which leads into an auxiliary reservoir 184 carried by casing 170. This auxiliary reservoir is elongated in a vertical direction and extends considerably below the lower part of casing 170 to form a settling chamber. A suitable drain plug 186 is provided in the lower part of this chamber.

The auxiliary reservoir 184 is provided with a cover 188 having an air bleed opening 190 therein. Water supply pipe 192 enters the auxiliary reservoir 184 and a float valve 194 is contained within this reservoir from which a branch pipe 196 leads around to the reservoir formed in the lower part of the casing 170. Float 198 is located within the auxiliary reservoir. Thus the level of water in both the reservoirs is determined by that in the auxiliary reservoir 184, and maintained just above the upper end of slot 182.

In this embodiment the operation is substantially the same as that shown in Figure 8, and just explained, however, by locating the auxiliary reservoir 184, as shown, and communicating it with the lower part of the casing 170 through the passage 182, the water in the reservoir 184 will be substantially quiet and will not be effected by the swirling action of the fluid drawn within the casing 170. Thus, all dust and dirt which is finally collected within the liquid in the chamber formed by the casing 170, due to the rotating motion of the water therein, will eventually be driven out through the slot 182 into the chamber 184 where it will either settle out to the bottom of said chamber or be discharged through an outlet port 200. The quiescent state of the liquid in reservoir 184 greatly enhances the settling action, as will be readily understood, so that the water discharged through duct 200 will be quite clean.

From the foregoing it will be seen that I have provided improved types of dust separators which are all operable to completely rid the air or other fluids of suspended solid particles but which at the same time do not involve the use of cylinders, tortuous passages, or baffles which not only tend to create a back-pressure for the fan to work against but also involve complicated and expensive constructions. My novel dust separators are, therefore, not only simple and inexpensive to construct but are positive and efficient in operation, economical as to the power consumed, easy to construct and readily adaptable to different types of installation or users. In addition, certain of my dust separators embody a very simple but effective means for dispersing water vapor or mist throughout the body of cleaned air and, therefore, operate as humidifiers.

The invention may be embodied in other specific forms without departing from the spirit or essential characteristics thereof. The present embodiments are therefore to be considered in all respects as illustrated and not restrictive, the scope of the invention being indicated by the appended claims rather than by the foregoing description, and all changes which come within the meaning the range of equivalency of the claims are therefore intended to be embraced therein.

What is claimed and desired to be secured by United States Letters Patent is:

1. A mechanism for separating suspended matter from fluid comprising a substantially cylindrical casing, a partition having a circular opening adjacent one end of said casing, an outlet element extending through the opening in said partition and having a truncated portion with its smaller end towards the partition and its larger end extending into the casing, means providing a fluid inlet adjacent to said conical element and transverse to its axis, a separated material outlet for the casing, and means for spinning said outlet element on its axis and applying a suction to its smaller end.

2. The device recited in claim 1 wherein said truncated conical element is imperforate.

3. The device recited in claim 1 wherein said suction means is a rotary fan attached to and carrying said outlet element.

ANDRE F. DE VIGAN.

CERTIFICATE OF CORRECTION.

Patent No. 2,233,520. March 4, 1941.

ANDRE F. de VIGAN.

It is hereby certified that error appears in the printed specification of the above numbered patent requiring correction as follows: Page 5, first column, line 3, for the word "users" read --uses--; same page, second column, line 6, claim 1, after "truncated" insert --conical--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.